United States Patent [19]
Harada

[11] Patent Number: 5,392,505
[45] Date of Patent: Feb. 28, 1995

[54] METHOD FOR MOUNTING AN ELASTIC ANNULAR MEMBER

[75] Inventor: Hiromitsu Harada, Ushiku, Japan

[73] Assignee: Canon Kabushiki Kaisha, Tokyo, Japan

[21] Appl. No.: 171,969

[22] Filed: Dec. 23, 1993

Related U.S. Application Data

[63] Continuation of Ser. No. 959,125, Oct. 9, 1992, abandoned.

[30] Foreign Application Priority Data

Oct. 29, 1991 [JP] Japan .................. 3-283223

[51] Int. Cl.$^6$ .................. B23P 11/02; B23Q 7/10
[52] U.S. Cl. .................. 29/450; 29/453; 29/235
[58] Field of Search .................. 29/450, 451, 453, 235

[56] References Cited

U.S. PATENT DOCUMENTS

| | | | |
|---|---|---|---|
| 2,968,864 | 1/1961 | Lee | 29/451 X |
| 3,581,379 | 12/1957 | Drobilits | 29/450 X |
| 4,206,538 | 6/1980 | Hayes et al. | 29/450 X |
| 4,286,367 | 9/1981 | Geisinger | 29/235 X |
| 4,532,706 | 8/1985 | Horn | 29/453 X |
| 4,666,215 | 5/1987 | Toms, Jr. | 29/450 X |
| 5,016,346 | 5/1991 | Gerst et al. | 29/450 X |

FOREIGN PATENT DOCUMENTS

| | | |
|---|---|---|
| 122323 | 1/1956 | Japan . |
| 101344 | 8/1980 | Japan .................. 29/451 |
| 58-70835 | 5/1983 | Japan . |

Primary Examiner—Timothy V. Eley
Assistant Examiner—Khan V. Nguyen
Attorney, Agent, or Firm—Fitzpatrick, Cella, Harper & Scinto

[57] ABSTRACT

A method of fitting an elastic ring on an outer circumferential portion of a workpiece includes the steps of inserting a hollow diameter-enlarging member into the elastic ring to hold the elastic ring on an outer circumferential portion of the diameter-enlarging member, in an enlarged diameter state; holding, at a holding position, the diameter-enlarging member having the elastic ring held thereon; and inserting the workpiece, which has a flange portion, into the diameter-enlarging member such that the flange portion of the workpiece contacts an end surface of the diameter-enlarging member and displaces the diameter-enlarging member from the holding position while keeping the elastic ring at the holding position to transfer the elastic ring to the workpiece by a contraction of the elastic ring from the enlarged diameter state to a reduced diameter state.

2 Claims, 14 Drawing Sheets

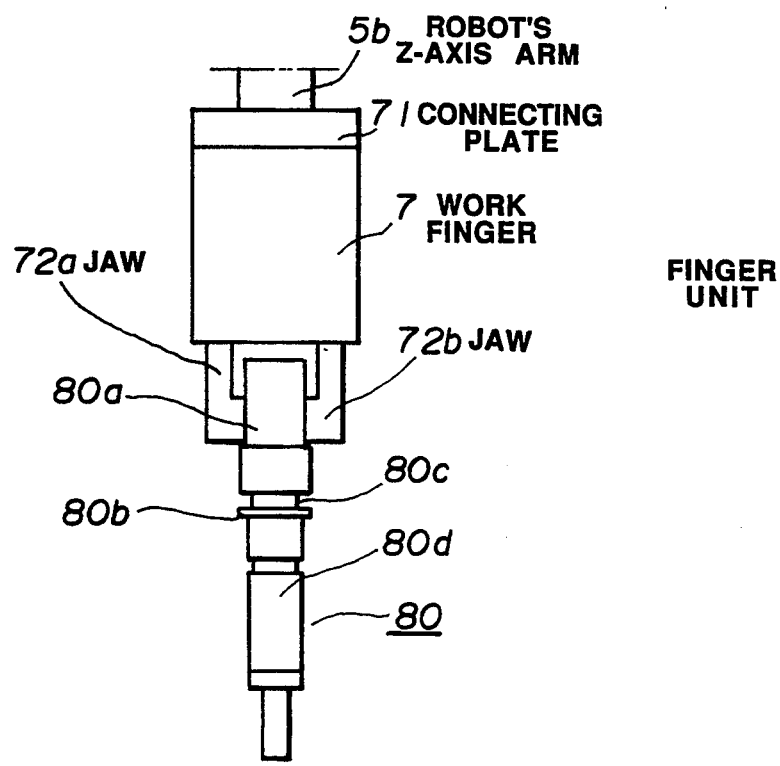
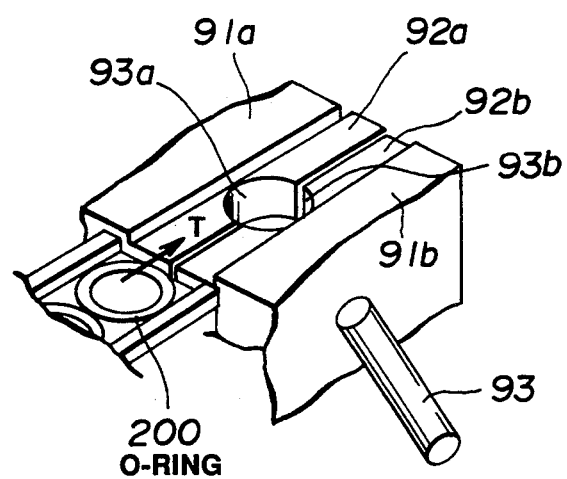

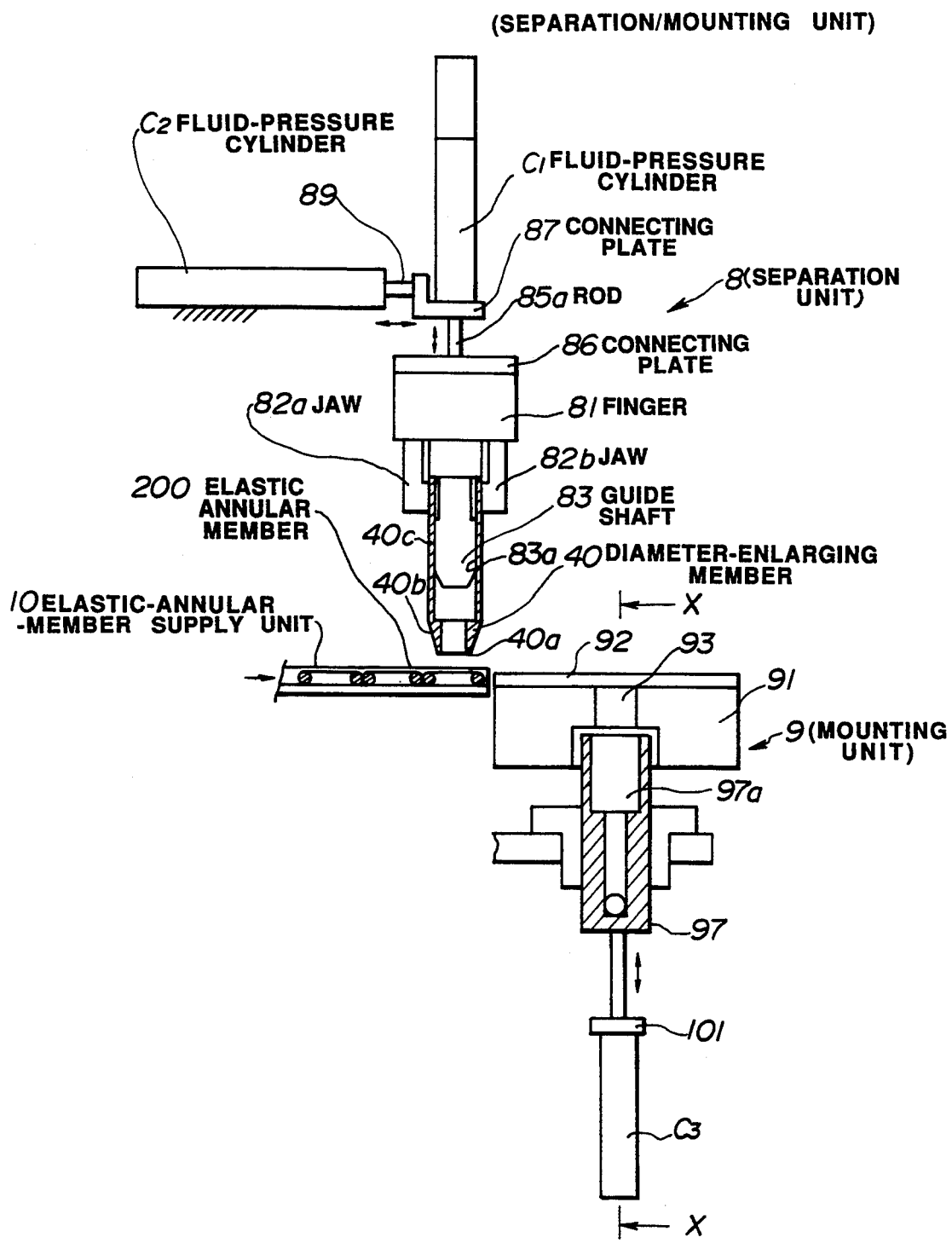

METHOD FOR MOUNTING AN ELASTIC ANNULAR MEMBER

This application is a continuation of application Ser. No. 07/959,125, filed Oct. 9, 1992, now abandoned.

BACKGROUND OF THE INVENTION

1. Field of the Invention

This invention relates to a method and apparatus of mounting an elastic annular member, and for automatically fitting an elastically-deformable elastic annular member having an inner diameter which is smaller than the outer diameter of a workpiece, such as a shaft member or the like, on the workpiece.

2. Description of the Prior Art

In some conventional apparatuses for mounting an elastically-deformable elastic annular member, such as an O-ring or the like, on a workpiece, such as a shaft member or the like, a leading-end portion of the workpiece in which the elastic annular member is to be mounted is covered with a cap whose outer surface has the shape of a cone, the elastic annular member having an inherent inner diameter smaller than the outer diameter of the work is fitted on the cap, and the elastic annular member is fitted on the workpiece by enlarging the inner diameter of the elastic annular member along the outer surface of the cap by pushing down the elastic annular member toward the workpiece with a pushing rod having a plurality of pawls (see Japanese Utility Model Application Public Disclosure (Kokai) Nos. 58-70835 (1983) and 57-122323 (1972)).

However, in the above-described conventional approach, after covering the workpiece with the conical cap for enlarging the inherent inner diameter of the elastic annular member to an inner diameter greater than the outer diameter of the workpiece, the elastic annular member is pushed down toward the workpiece by the pushing rod having the plurality of pawls. Hence, a complicated apparatus is needed, and time is needed for attaching and detaching the conical cap, resulting in a long cycle time.

SUMMARY OF THE INVENTION

It is an object of the present invention to overcome the above-described problems in the prior art by making a tubular holding member holding an elastic annular member around its outer circumferential portion in a state in which the diameter of the elastic annular member is enlarged to be in a standby state at a mounting position, pushing a workpiece into the holding member, extracting the elastic annular member from the outer circumferential surface of the holding member, and fitting the extracted elastic annular member in the workpiece, whereby unnecessary operations in mounting the elastic annular member are omitted.

It is another object of the present invention to provide a mounting apparatus for fitting an elastic annular member, such as an O ring or the like, on a shaft member, which is provided with a novel mechanism, and which can be secured promptly with certainty a mounting operation. The mounting apparatus of the present invention includes a diameter-enlarging member for enlarging the diameter of the elastic annular member so as to be greater than the outer diameter of a fitting portion of the shaft member, and a mechanism for inserting the shaft member inside the diameter-enlarging member, and subsequently fitting the elastic annular member in the fitting portion of the shaft member by pushing out the diameter-enlarging member.

It is still another object of the present invention to provide the above-described mounting apparatus which further includes means for detecting a state in which the elastic annular member is mounted on the shaft member.

In accordance with one aspect of the invention, a method for fitting an elastically-deformable elastic annular ring on a workpiece having an outer diameter greater than an inner diameter of the annular ring in an unbiased state comprises the steps of inserting a tubular holding member through the annular ring to position it at an outer circumferential portion of the tubular holding member in a state in which the inner diameter of the annular ring is enlarged so as to be greater than the outer diameter of the workpiece, placing the holding member in a standby state at a mounting position, pushing the workpiece within the holding member and moving the holding member axially with respect to the annular ring, and pushing the holding member through the elastic annular ring so the annular ring engages an outer circumferential portion of the workpiece.

In accordance with another aspect of the invention, the apparatus for mounting an elastic annular ring on a shaft member comprises a hollow diameter-enlarging member for enlarging the diameter of the annular ring, first moving means for moving the diameter-enlarging member in vertical and horizontal directions, a mounting unit comprising a receiving guide member for receiving the diameter-enlarging member at a position having a predetermined depth in accordance with a descent of the diameter-enlarging member, and an annular ring receiving member for holding the annular ring at a predetermined position in accordance with the descent of the diameter-enlarging member within the receiving guide member. In addition, means are provided for inserting a shaft member including a fitting portion for receiving the annular ring within the diameter-enlarging member, wherein the inserting means pushes the diameter-enlarging member axially through the annular ring as the ring is held at the predetermined position until the fitting-portion opposes the annular ring and the annular ring contracts to engage the fitting portion.

In accordance with yet another aspect of the invention, an apparatus for mounting an elastic annular ring on a workpiece comprises a hollow diameter-enlarging member for enlarging the diameter of the annular ring, with the enlarging member having a tapered tip to be inserted through the annular ring, first moving means for moving the diameter-enlarging member in vertical and horizontal directions, and a supply unit for supplying annular rings to a position below the enlarging member. A mounting unit includes a receiving guide member for receiving the diameter-enlarging member as it is moved vertically downwardly by the first moving means, and an annular ring receiving member for holding the annular ring at a stationary position as the diameter-enlarging member is moved downwardly. In addition, inserting means inserts a workpiece, having a fitting portion for receiving the annular ring, into a hollow end of the engaging member and pushes the engaging member downwardly as the annular ring stays at the stationary position, wherein the workpiece is pushed downwardly until the fitting portion is opposite to the annular ring, at which point the annular ring contracts to engage the fitting portion.

These and other objects, aspects, features and advantages of the present invention will become apparent from the following detailed description of the preferred embodiments taken in conjuction with the accompanying drawings.

BRIEF DESCRIPTION OF THE DRAWINGS

FIG. 2 is a diagram illustrating the finger shown in FIG. 1 for grasping a shaft member on which an elastic annular member is mounted;

FIG. 3 is a diagram illustrating the configuration of a separation unit and a mounting unit;

FIG. 4 is a partial perspective view of the mounting unit shown in FIG. 3;

DESCRIPTION OF THE PREFERRED EMBODIMENT

Figure 1:
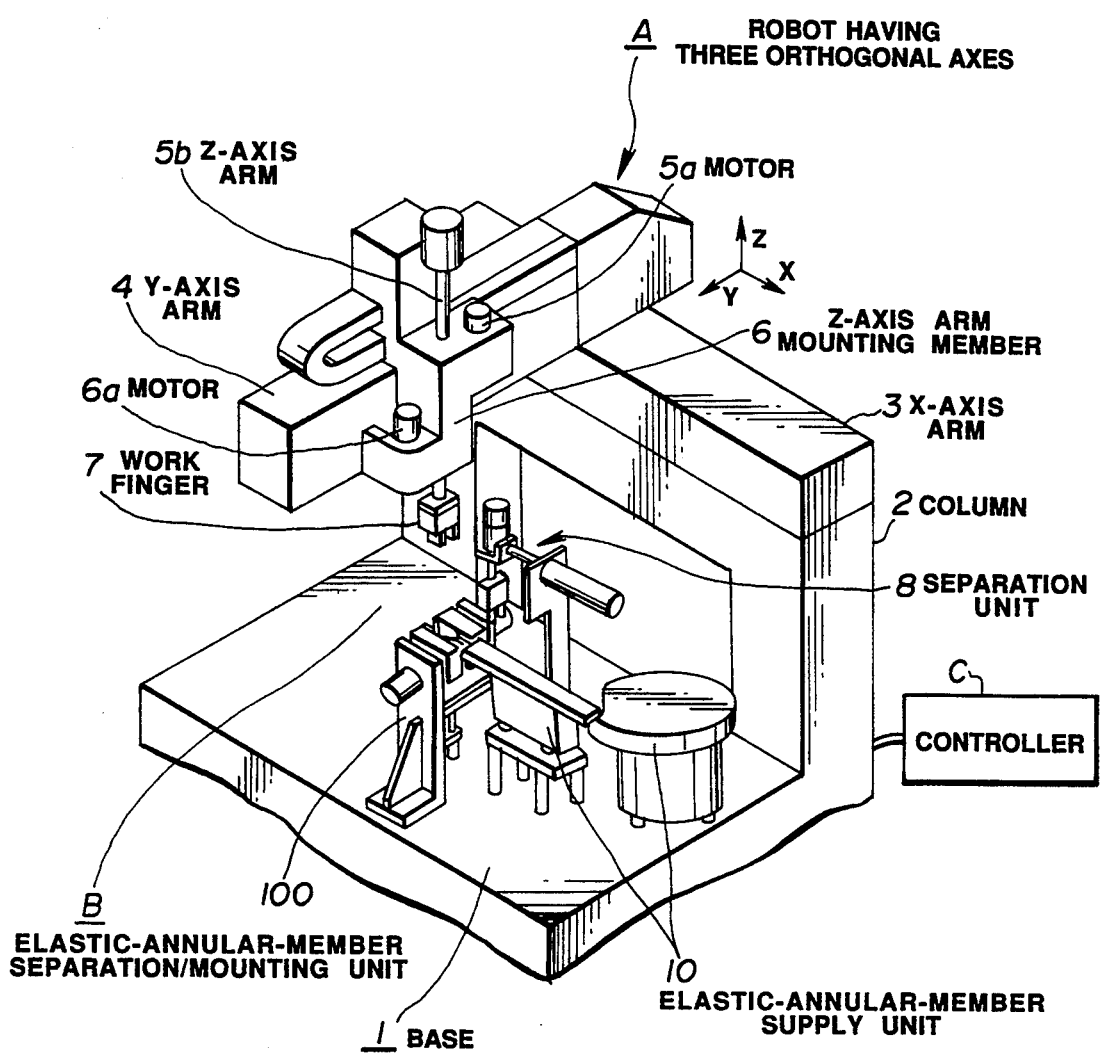
FIG. 1 is a diagram showing the entire configuration of a mounting apparatus according to an embodiment of the present invention.

FIG. 1 is a perspective view of an elastic-annular-member mounting apparatus for executing a method of mounting an elastic annular member according to an embodiment of the present invention. Each of the elements shown in block outline in FIG. 1, as well as in the other Figures, is well known per se, and a specific type of construction is not critical to carry out the invention or the disclosure of the best mode for carrying out the invention. An explanation will now be provided of a case of mounting an O-ring as the elastic annular member.

In FIG. 1, symbol A represents a robot, having three orthogonal axes, which serves as conveying means. The robot A includes an x-axis arm 3 fixed to a column 2 of a base 1 and extending in the x-axis direction, a y-axis arm 4 supported on the x-axis arm 3 so as to be movable in the x-axis direction and reciprocated in the x-axis direction by x-axis driving means (not shown), and a z-axis-arm mounting member 6 supported on the y-axis arm 4 so as to be movable in the y-axis direction and reciprocated in the y-axis direction by y-axis driving means (not shown).

A z-axis arm 5b extending in the z-axis direction is pivoted on the z-axis-arm mounting member 6, and is reciprocated in the z-axis direction by a known ball-screw mechanism driven by a motor 5a. The z-axis-arm mounting member 6, the z-axis arm 5b, the motor 5a and the ball-screw mechanism constitute insertion means of the conveying means.

A work finger 7 is rotatably pivoted at a lower-end portion of the z-axis arm 5b, and is provided with a known transmission mechanism driven by a motor 6a whose rotational force is transmitted to the transmission mechanism irrespective of the moving position in the z-axis direction. By starting the motor 6a, the work finger 7 is rotated and positioned.

Symbol B represents a separation/mounting unit mounted on the base 1. The unit B comprises a separation unit 8 for disposing an O-ring at a mounting position, a mounting unit 9 (see FIG. 3) for mounting the O-ring on a workpiece, and a diameter-enlarging member 40 (see FIG. 3) which performs separation, holding and mounting of the O-ring while being moved between respective components of the separation unit 8 and the mounting unit 9. There is also shown an O-ring supply unit 10.

A controller C controls the drive of the robot A having three orthogonal axes, and the separation/mounting unit B, as will be described later.

As shown in FIG. 2, the work finger 7 is mounted on the z-axis arm 5b of the robot A via a connecting plate 71. Jaws 72a and 72b perform opening and closing operations to grasp a workpiece 80. The shaft member of the workpiece 80 includes a portion 80a to be grasped by the jaws 72a and 72b, a flange portion 80b, a fitting portion 80c in which an O-ring 200 is to be fitted, a shaft portion 80d to be inserted within a diameter-enlarging member (to be described later), and the like.

Next, an explanation will be provided of the separation/mounting unit B with reference to FIGS. 3 and 4.

The separation unit 8 comprises a cylinder $C_1$ which holds a diameter-enlarging member 40 and moves vertically, a cylinder $C_2$ which moves the diameter-enlarging member 40 in the horizontal direction, and the like.

The mounting unit 9 comprises a guide member 97 for receiving the diameter-enlarging member 40 therewithin, an openable/closable member 91 (91a and 91b) for guiding the diameter-enlarging member 40 to the guide member 97 while holding the O-ring at a predetermined position, a cylinder $C_3$ for driving the receiving guide member 97, driving means $C_{4-1}$ and $C_{4-2}$ (see FIG. 5) for the openable/closable member 91, and the like.

The diameter-enlarging member 40 serves as a holding member of the O-ring, and comprises a tubular main-body portion 40c and a tapered portion 40b. The diameter of a leading-end portion 40a of the tapered portion 40b is smaller than the natural inner diameter of the O-ring 200. The outer diameter of the portion 40c equals the diameter of the O-ring 200 in an enlarged state. In the present embodiment, the outer diameter of the portion 40c equals the outer diameter of the flange portion of the O-ring groove of the workpiece 80.

The diameter-enlarging member 40 is used for separation, holding and mounting of the O-ring while being moved between respective components of the separation unit 8 and the mounting unit 9.

The separation unit 8 moves the O-ring 200 supplied from the O-ring supply unit 10 to a mounting portion of the mounting unit 9, and holds the O-ring 200 at a predetermined position at an outer circumferential portion of the diameter-enlarging member 40.

Reference numeral 81 represents the main body of the finger for holding the diameter-enlarging member 40. Jaws 82a and 82b provided at the lower-end surface of the main body 81 perform opening and closing operations to grasp the diameter-enlarging member 40 as shown in FIG. 3. A guide shaft 83 descending from the main body 81 of the finger is mounted on the main body 81 of the finger. The outer diameter of the guide shaft 83 and the inner diameter of the diameter-enlarging member 40 are in a fitted state so that the diameter-enlarging member 40 can be grasped at an exact position by making the guide shaft 83 a guide. The outer diameter of an upper portion 83a of the shaft equals the outer diameter of the diameter-enlarging member 40. Thus, the guide shaft 83 can support the diameter-enlarging member 40 against a lateral force applied thereto.

The main body 81 of the finger is mounted on a rod 85a of the cylinder $C_1$ via a connecting plate 86.

The cylinder $C_1$ is fixed to a rod 89 of the cylinder $C_2$ by a connecting plate 87.

The main body 81 of the finger moves in the vertical direction and in the horizontal direction in FIG. 3 by predetermined distances by operating the cylinders $C_1$ and $C_2$, respectively. That is, as shown in FIG. 3, the diameter-enlarging member 40 is positioned above a supplying portion of the supply unit 10 by being held at a position where the cylinder $C_1$ is raised and the cylinder $C_2$ is retracted.

Reference numerals 91a and 91b represent O-ring receptacles. As shown in FIG. 4, guide grooves 92a and 92b for O-rings are formed at end portions of the O-ring receptacles 91a and 91b.

Circular notches 93a and 93b are formed at the centers of the end portions of the O-ring receptacles 91a and 91b, respectively, so that the leading-end portion 40a of the diameter-enlarging member 40 is guided by a circular portion provided by the notches 93a and 93b. FIG. 4 shows the relationship between the guided direction of O-rings and the O-ring receptacles 91a and 91b.

Figure 5:
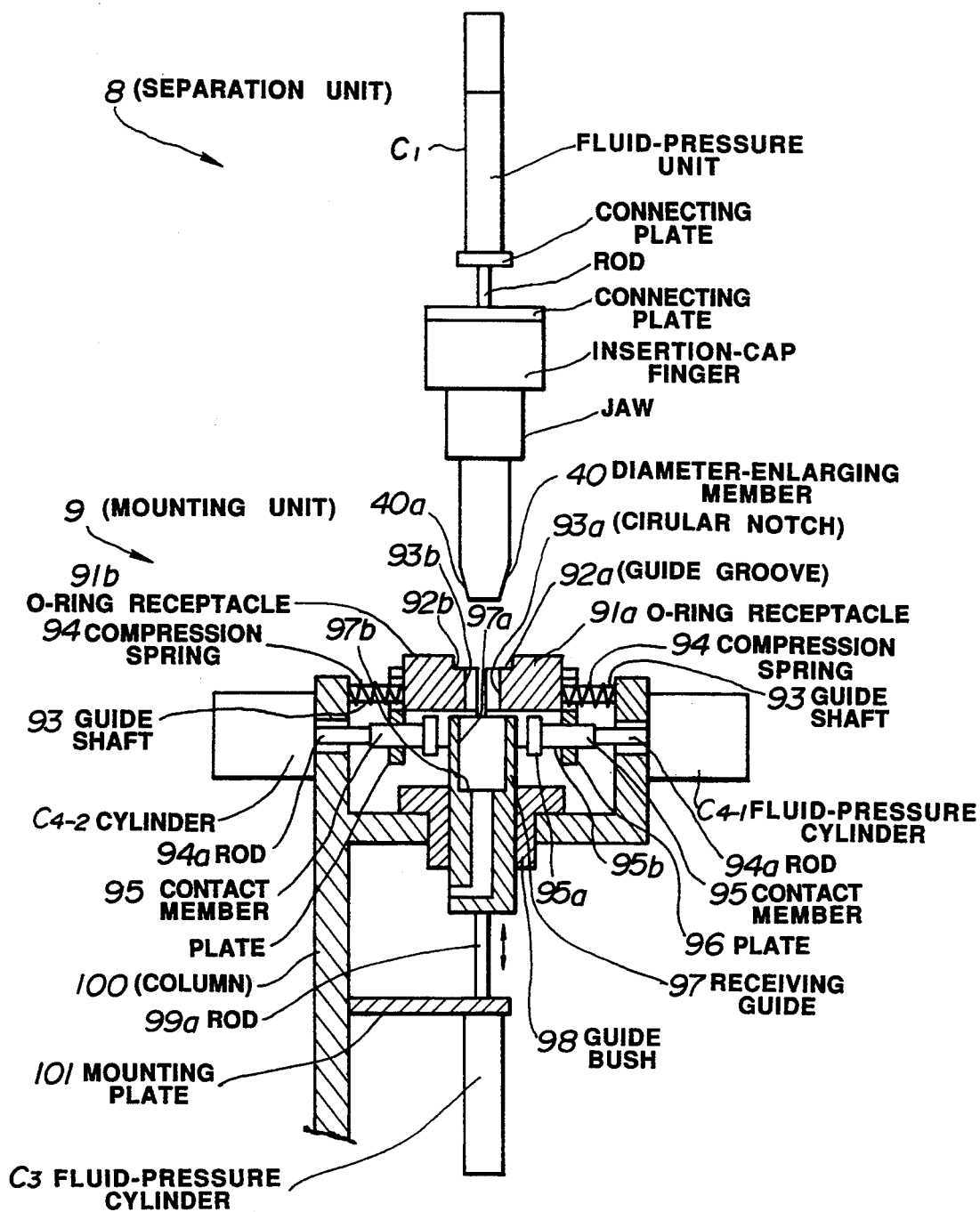
FIG. 5 is a diagram illustrating the operation of the mounting unit.

The O-ring receptacles 91a and 91b are slidably guided in the right and left directions in FIG. 5 by a guide shaft 93 mounted on a column 100. Compression coil springs 94 push the O-ring receptacles 91a and 91b in the directions of closing the O-ring receptacles 91a and 91b along the guide shaft 93 with a predetermined spring force.

Cylinders $C_{4-1}$ and $C_{4-2}$ are mounted on the column 100. Contact members 95 (see FIG. 5) are mounted on the leading ends of rods 94a of the cylinders $C_{4-1}$ and $C_{4-2}$. Flange members 95a are formed on the leading ends of the contact members 95. Main-body portions 95b of the contact members 95 are threaded through holes 96a provided in plates 96 fixed to the O-ring receptacles 91a and 91b so as to be able to open the O-ring receptacles 91a and 91b against the spring force of the compression coil springs 94 by operating the cylinders $C_{4-1}$ and $C_{4-2}$.

A receiving guide 97 receives the diameter-enlarging member 40. The inner diameter of a receiving portion 97a of the receiving guide 97 is slightly greater than the outer diameter of the main-body portion 40c of the diameter-enlarging member 40 so that the diameter-enlarging member 40 can be held at a step portion 97b at an inserted position having a predetermined depth. The outer circumferential portion of the receiving guide 97 is guided by a guide bush 98 mounted on the column 100 so that the receiving guide 97 slides within the guide bush 98.

A rod 99a of the cylinder $C_3$ is fixed to a lower-end portion of the receiving guide 97 so that the receiving guide 97 is vertically moved by driving the cylinder $C_3$.

An explanation will now be provided of a method of mounting an O-ring according to the present invention.

FIGS. 6 through 14 are diagrams illustrating the method of mounting an O-ring of the present invention in the sequence of a mounting operation.

For the convenience of explanation, in FIGS. 7 through 14, the arrangement of the separation unit is shown by rotating the unit by 90°. By setting the rod 85a of the cylinder $C_1$ at a raised position and the rod 89 of the cylinder $C_2$ at a retracted position (step 1), the diameter-enlarging member 40 is held at a preparatory position above the supplying portion of the supply unit 10 (step 2).

(1) Subsequently, the finger 81 is lowered to grasp the diameter-enlarging member 40 by operating the cylinder $C_1$, and the leading-end portion 40a of the diameter-enlarging member 40 is inserted and held in the inner-diameter portion of the O-ring 200 (step 3).

Figure 6:
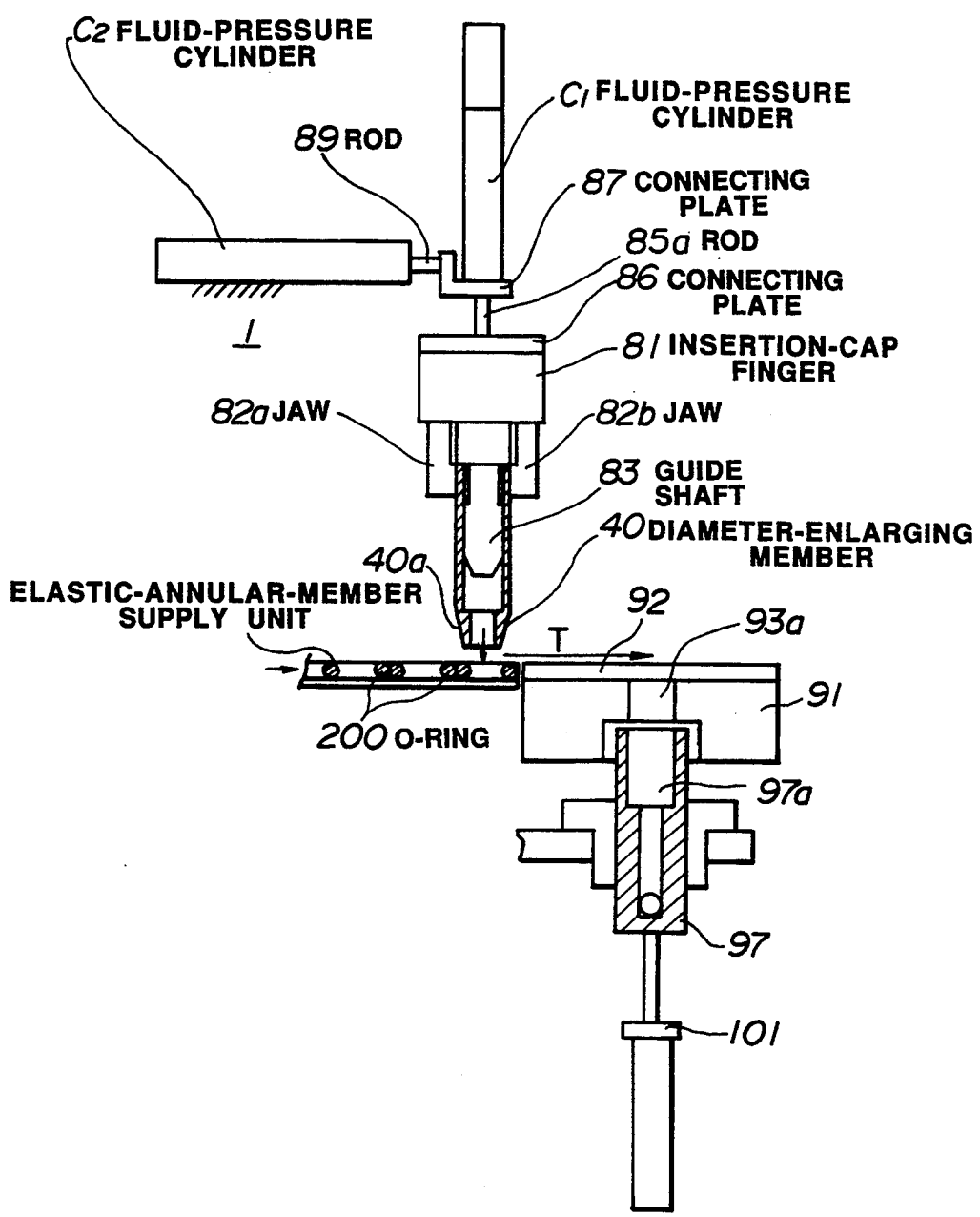
FIGS. 6 through 14 are diagrams illustrating the sequence of operations of the apparatus according to the embodiment.
Figure 7:
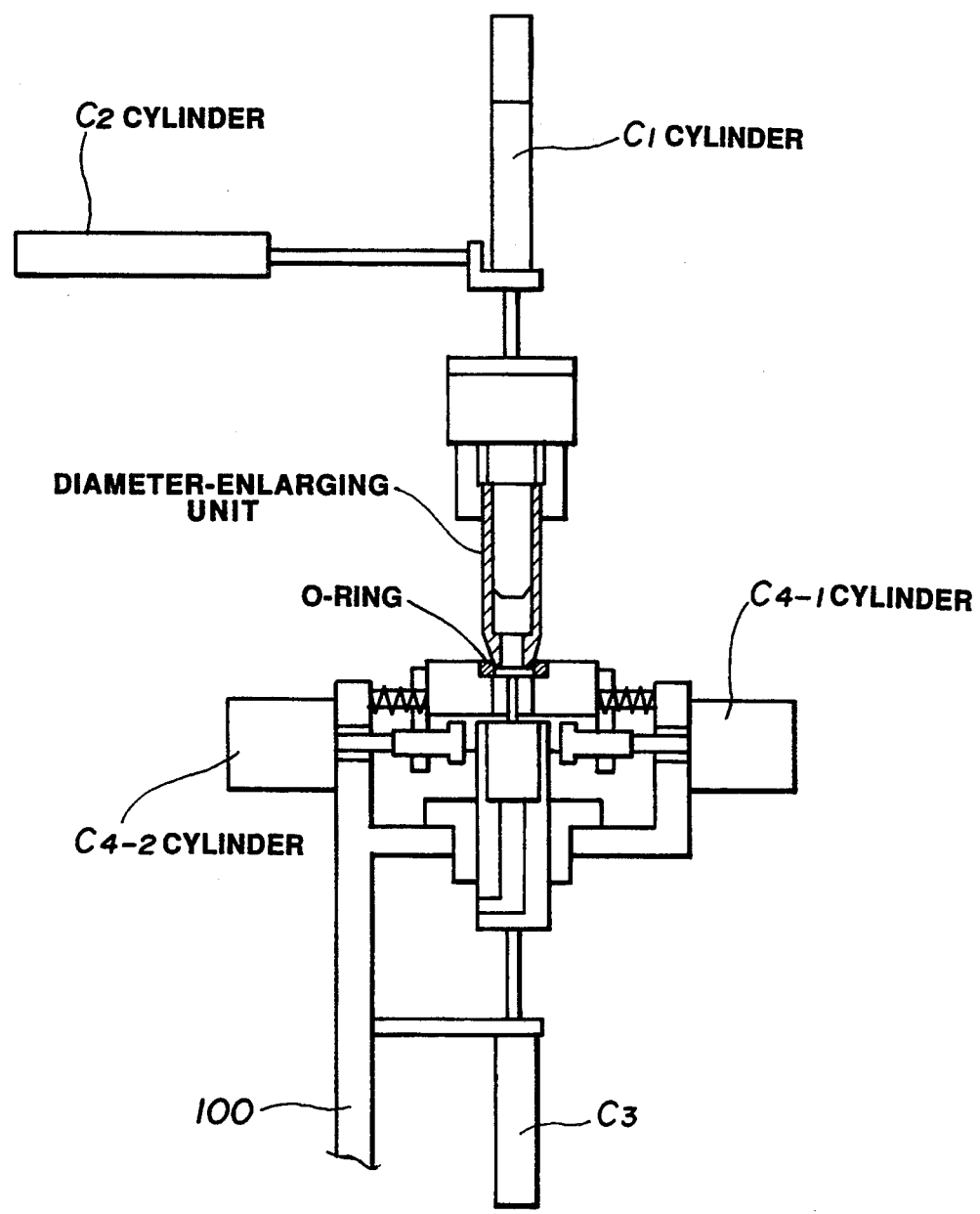
Figure 8:
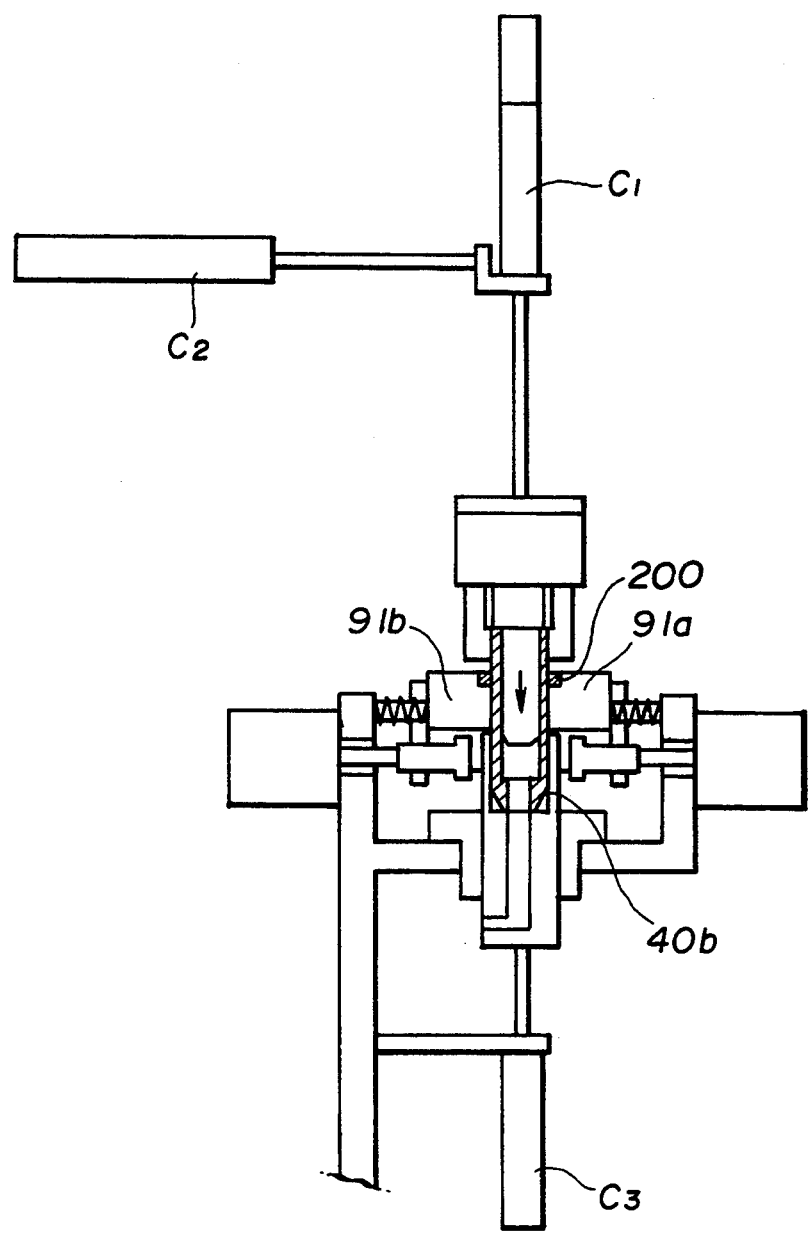

In this state, by operating the cylinder $C_2$, the rod 89 is advanced to move the O-ring 200 along the guide groove 92 in the direction of arrow T shown in FIG. 6 so that the diameter-enlarging member 40 holding the O-ring at the leading end thereof is positioned right above a guide hole formed by the notches 93a and 93b of the O-ring receptacles 91a and 91b of the mounting unit 9 (this position is termed a mounting-preparatory position) (step 4, see FIG. 7).

(2) Subsequently, by operating the cylinder $C_1$, the diameter-enlarging member 40 is lowered. As the tapered portion 40b at the leading end of the diameter-enlarging member 40 enters the circular notches 93a and 93b of the O-ring receptables 91a and 91b, the diameter-enlarging member 40 is inserted within the receiving guide member 97 while opening the O-ring receptacles 91a and 91b to the right and left, respectively (step 5).

By the descent of the rod 85a of the cylinder $C_1$ by a predetermined amount, the leading end of the diameter-enlarging member 40 contacts the bottom of the insertion hole of the receiving guide member 97 and stops at that position.

At that time, since the movement of the O-ring 200 is regulated by the guide-groove portion, the diameter of the O-ring 200 is enlarged by the tapered portion of the diameter-enlarging member 40 in accordance with the descent of the diameter-enlarging member 40, and the O-ring moves upwardly relative to the diameter-enlarging member 40 as it slides along its outer circumferential surface. In a state in which the leading end of the diameter-enlarging member 40 stops at the bottom of the insertion hole of the receiving guide member 97, the O-ring 200 is positioned at a predetermined outer circumferential position of the diameter-enlarging member 40 (step 8, see FIG. 8).

Figure 9:
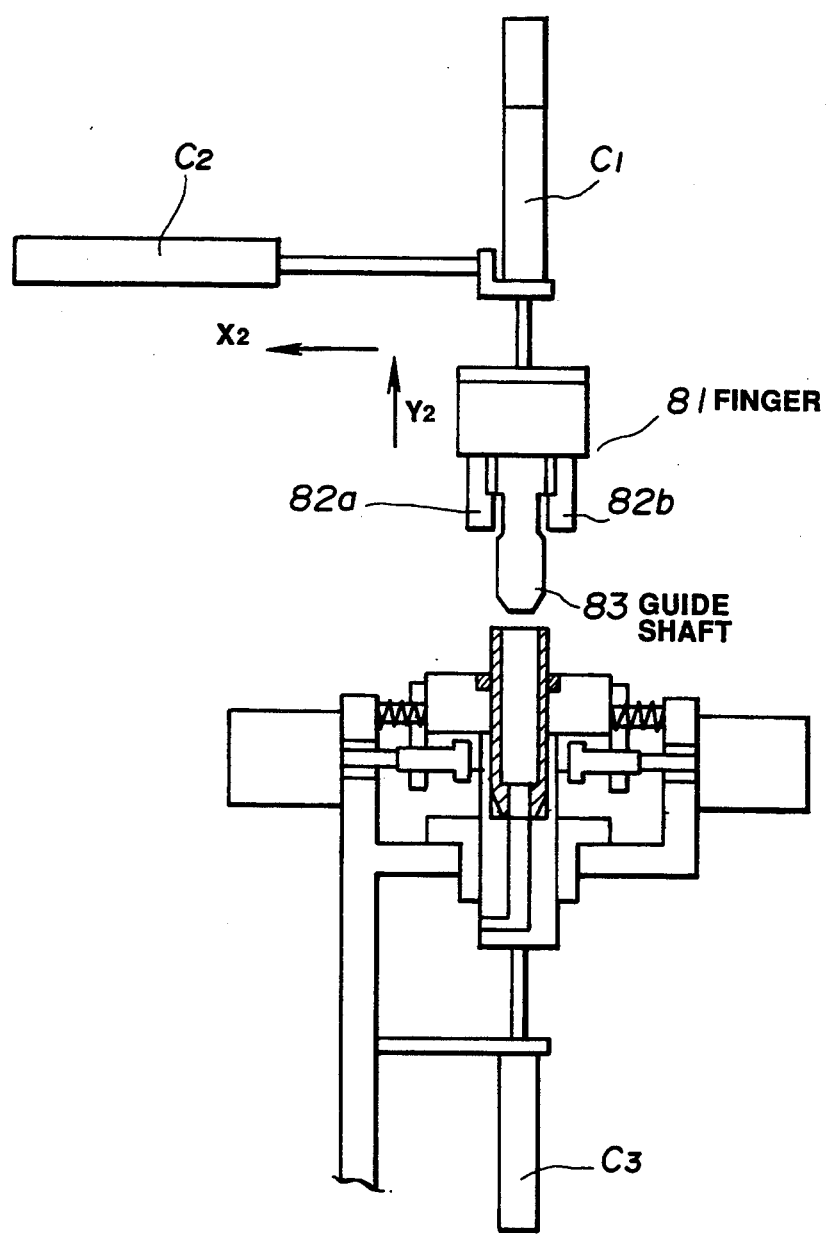

(3) Subsequently, the jaws 82a and 82b of the finger 81 are opened, and by operating the cylinder $C_1$, the finger 81 is raised in the direction $Y_2$ shown in FIG. 9 to be in a raised position (step 7).

Figure 10:
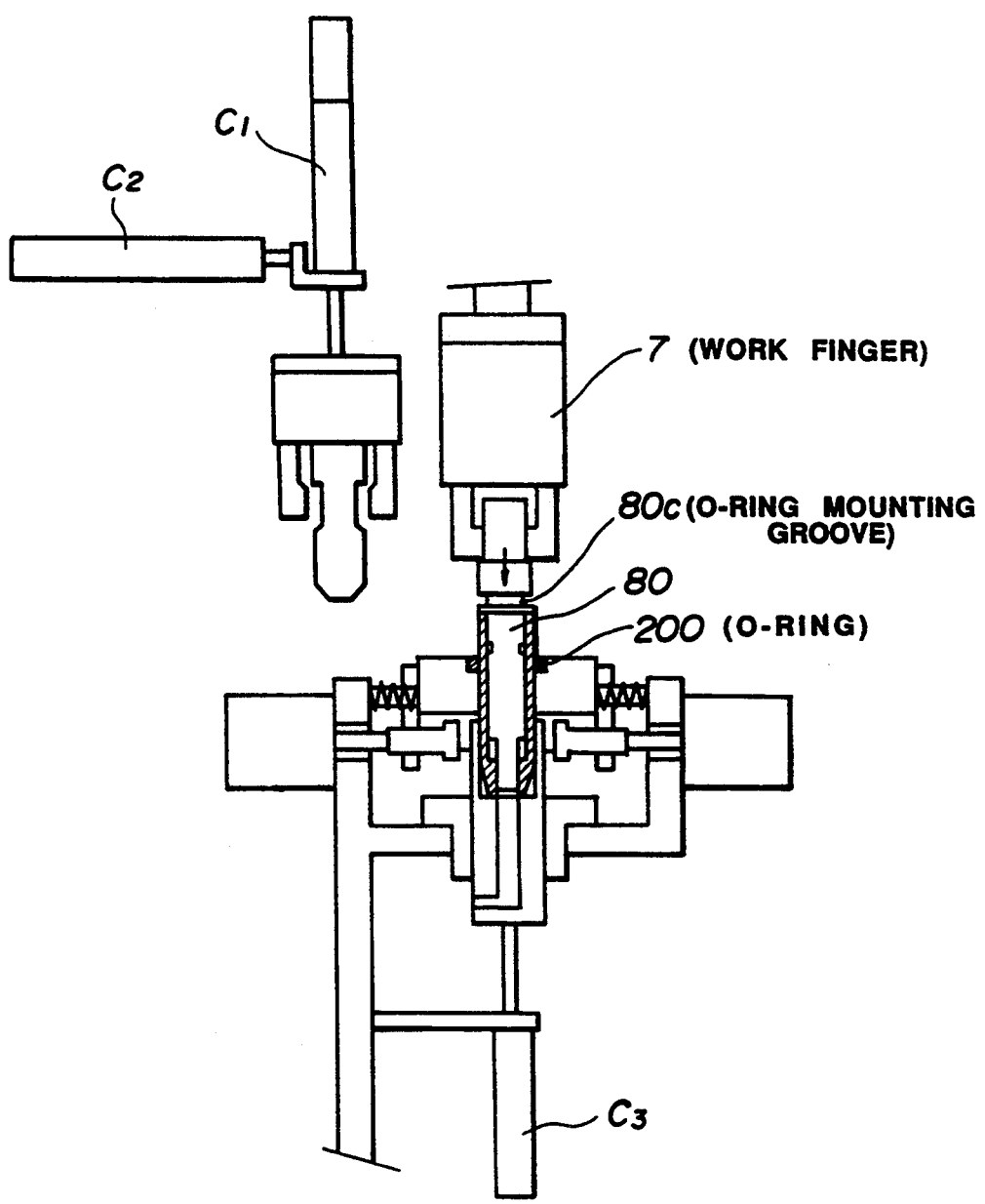
Figure 11:
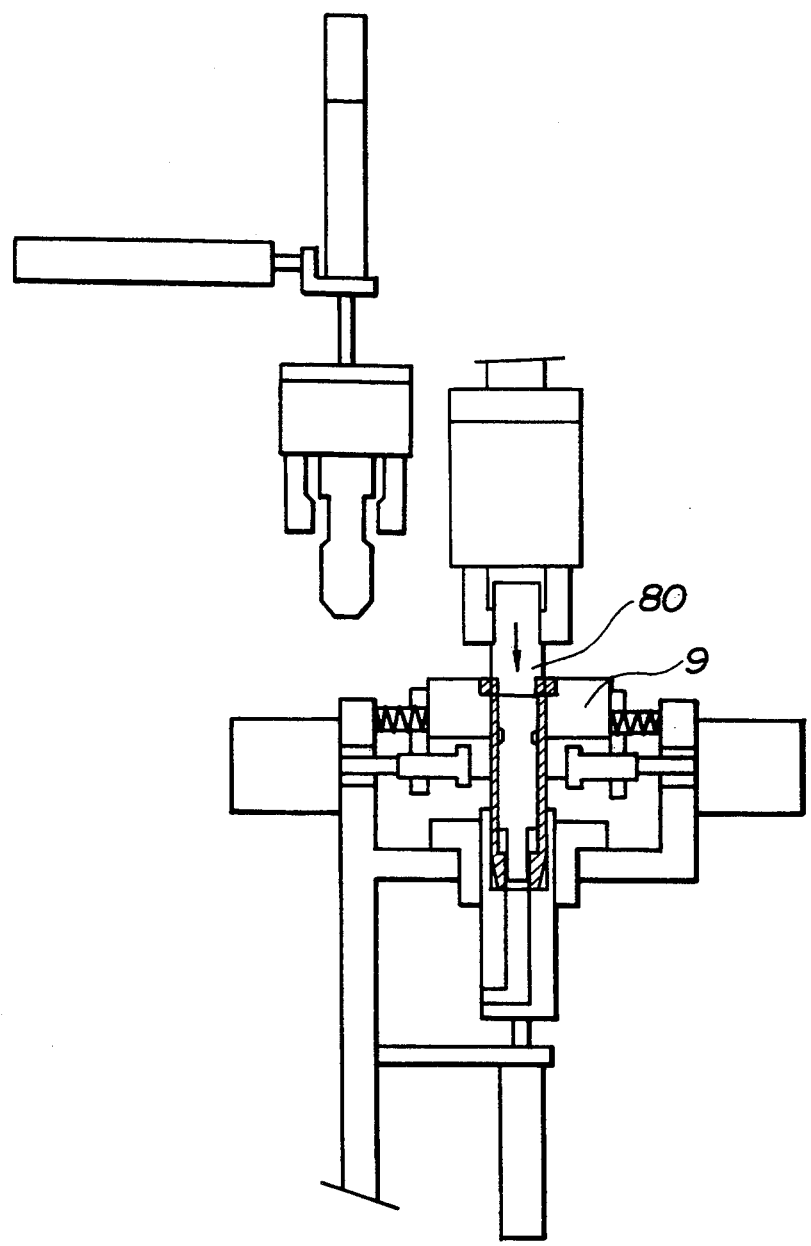
Figure 12:
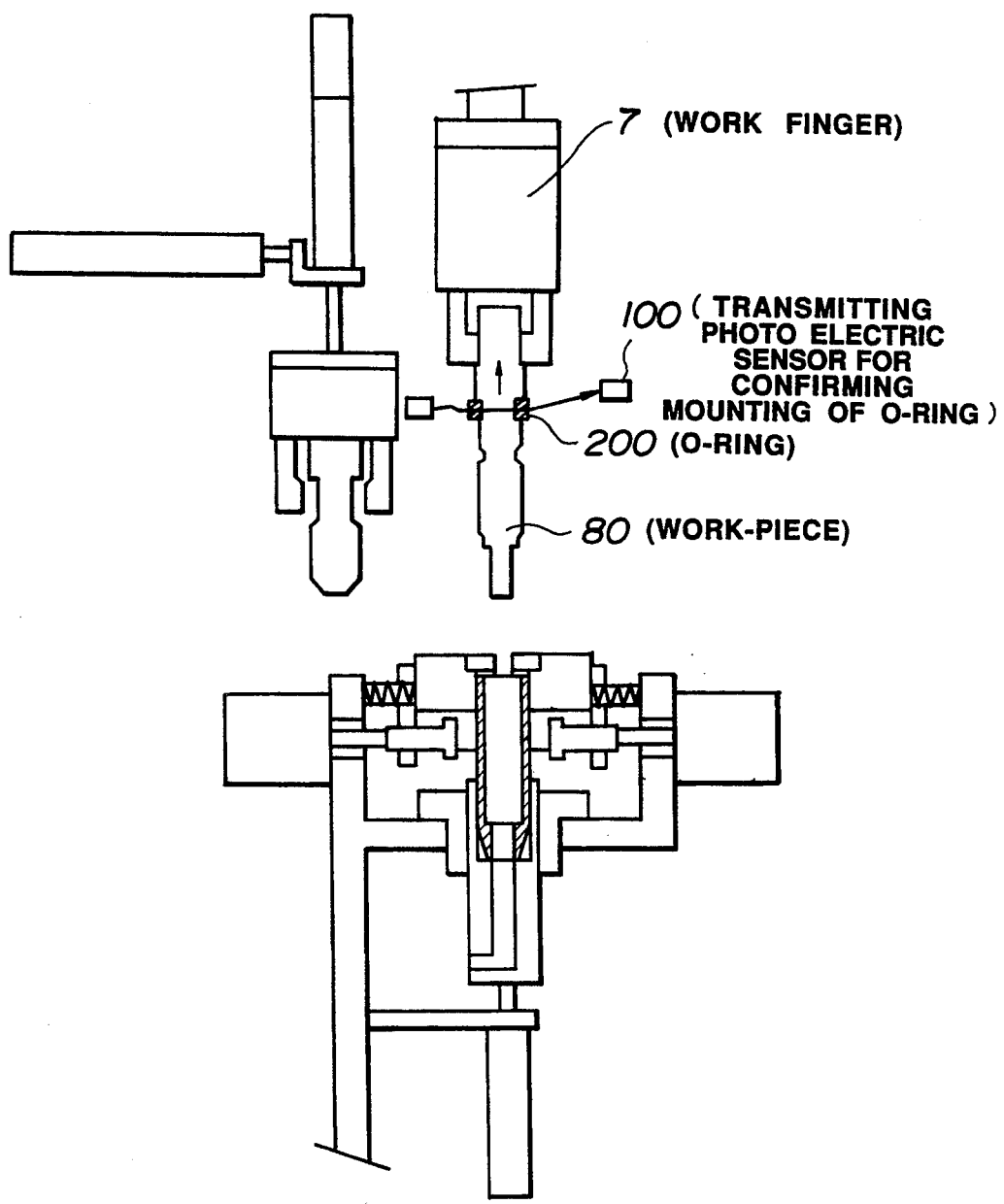

(4) After retracting the finger 81 in the direction $X_2$ by operating the cylinder $C_2$ (step 8), the shaft member 80 taken out by work conveying means (not shown) is inserted in the diameter-enlarging member 40 using the work finger 7 so that the upper-end surface of the diameter-enlarging member 40 contacts the flange portion of the O-ring groove of the shaft member 80 (step 9, see FIG. 10).

(5) If the shaft member 80 is further lowered by the work finger 7, the diameter-enlarging member 40 is also lowered by being pushed by the flange portion 80b. The O-ring 200 moves along the outer circumferential portion of the diameter-enlarging member 40. When the height of the O-ring fitting portion, or mounting groove, 80c of the shaft member 80 coincides with the height of the guide grooves 92a and 92b, the O-ring 200 is detached from the outer circumference of the diameter-enlarging member 40, and is mounted within the groove of the fitting portion in accordance with shrinkage of the O-ring 200 from a state in which the diameter is enlarged to a state in which the diameter is reduced.

In the present embodiment, the outer diameter of the flange portion of the shaft 80 equals the outer diameter of the diameter-enlarging member 40. Hence, after moving along the outer circumference of the flange portion of the diameter-enlarging member 40, the O-ring 200 is fitted in the O-ring groove due to the O-ring's own elastic force (shrinkage force) (step 10, see FIG. 11).

(6) By upwardly moving the work finger 7, the shaft member 80 is extracted from the diameter-enlarging member 40. After confirming the mounting of the O-ring 200 by a transmitting photoelectric sensor 100, the workpiece is accommodated in a stock (not shown) (step 11, see FIG. 12).

Figure 13:
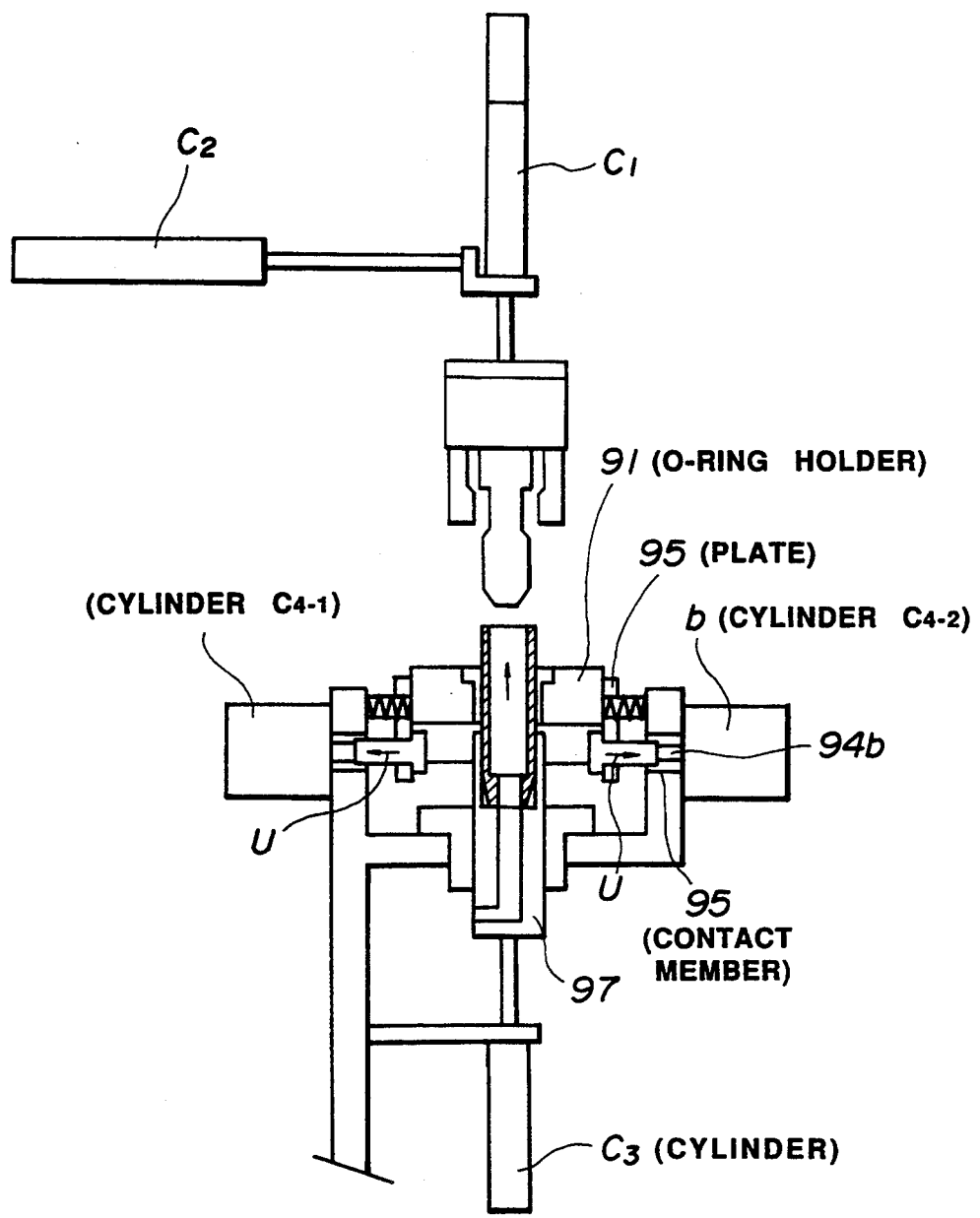

(7) Subsequently, if the rods 94a are retracted by operating the cylinders $C_{4-1}$ and $C_{4-2}$, the contact members 95a and 95b move in the directions of arrow U shown in FIG. 13 to open the O-ring receptacles 91a and 91b in the rightward and leftward directions, respectively, via the plates 96.

Subsequently, the receiving guide 97 is moved upwardly by operating the cylinder $C_3$ to eject the diameter-enlarging member 40 (step 12, see FIG. 13).

Figure 14:
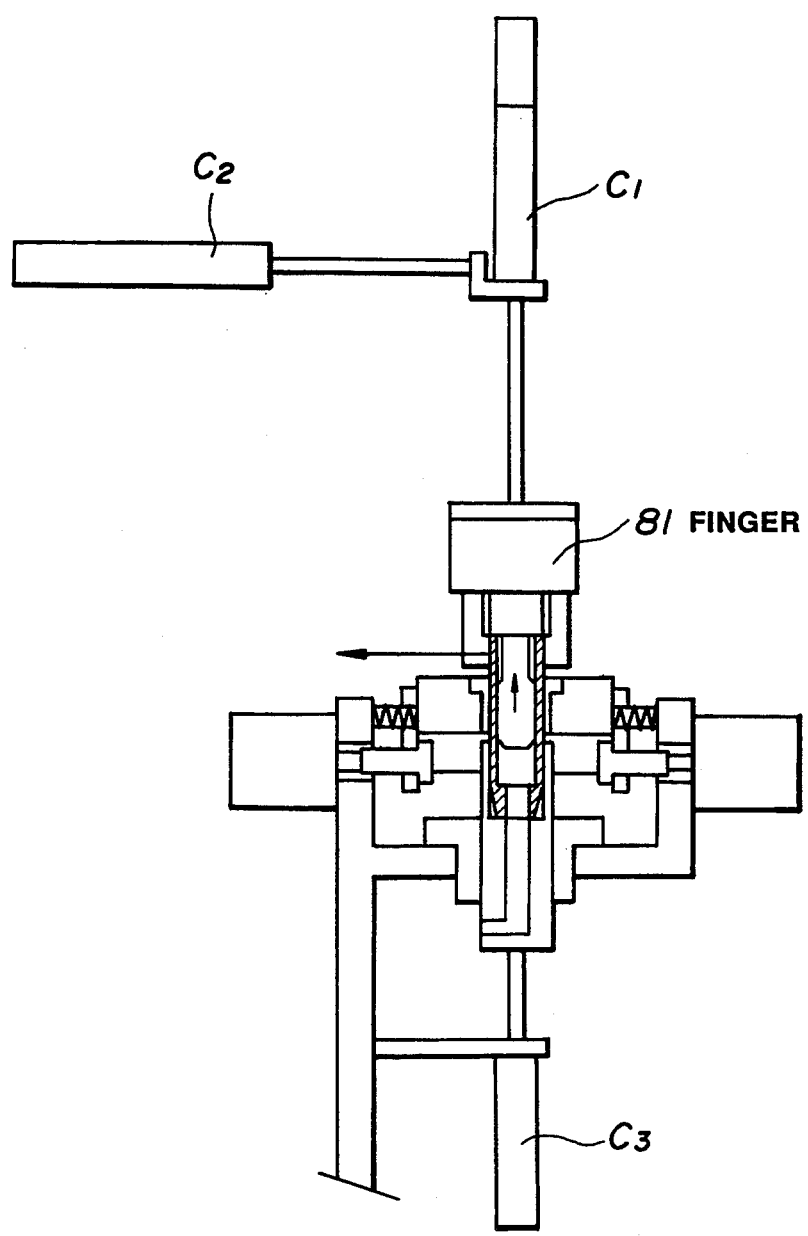

(8) Subsequently, after moving the diameter-enlarging member 40 upwardly while grasping it with the finger 81, the diameter-enlarging member 40 is returned to the initial position (step 13, see FIG. 14).

The process of mounting a plurality of O-rings is performed by repeating the above-described steps 1 through 13.

As explained above, according to the present invention, a holding member holding an O-ring at its outer circumferential portion in a state in which the diameter of the O-ring is enlarged is made to be in a standby state, and the O-ring at the outer circumferential portion of the holding member is fitted in a groove of a workpiece by pushing the workpiece within the holding member. Hence, the present invention has the following advantages.

(1) The O-ring can be inserted in the workpiece merely by a descending operation of the O-ring in the z-axis direction by a robot.

(2) Accordingly, the configuration of the apparatus at the side of the robot is simplified, and it is possible to perform a prompt mounting operation of the O-ring.

(3) Preparation for mounting another O-ring can be performed while the robot places a workpiece in which an O-ring has been mounted and takes out the next workpiece. Hence, the process time in an assembling line or the like can be shortened.

Although specific embodiments of the present invention have been described above in detail, it will be understood that this description is merely for purposes of illustration. Various modifications and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A method for fitting an elastic annular ring on an outer circumferential portion of a workpiece, said method comprising the steps of:

partially inserting a hollow diameter-enlarging member into the elastic ring positioned at a supply position, the diameter-enlarging member holding the elastic ring on an outer circumferential portion in a partially enlarged diameter state;

grasping the diameter-enlarging member and ring positioned thereon with a robotic mechanism having a guide shaft insertable into the diameter-enlarging member and a pair of jaws securing an exterior portion of the diameter-enlarging member;

moving the diameter-enlarging member and ring positioned thereon grasped by the robotic mechanism to a fitting position to be received by a receptacle having a guide groove for receiving the elastic ring and a receiving guide for receiving the diameter-enlarging member;

holding the ring at the fitting position and further inserting the diameter-enlarging member by axially displacing the robotic mechanism to further expand the ring to an enlarged diameter state; and inserting the workpiece, which has a flange portion, into the diameter-enlarging member such that the flange portion of the workpiece contacts an end surface of the diameter-enlarging member and axially displaces the diameter-enlarging member in the receiving guide past the position of the ring while keeping the elastic ring in the guide groove at the fitting position to transfer the elastic ring to the workpiece by a contraction of the elastic ring from the enlarged diameter state to a normal diameter state.

2. A method according to claim 1, further comprising the step of detecting when the elastic ring is engaged on the workpiece.

* * * * *

UNITED STATES PATENT AND TRADEMARK OFFICE
CERTIFICATE OF CORRECTION

PATENT NO. : 5,392,505
DATED : February 28, 1995
INVENTOR(S) : Harada

It is certified that error appears in the above-indentified patent and that said Letters Patent is hereby corrected as shown below:

Title page, item
[56] REFERENCES CITED:

U.S. PATENT DOCUMENTS, "3,581,379  12/1957  Drobilits" should read --3,581,379  6/1971  Drobilits--.

Figure 15:
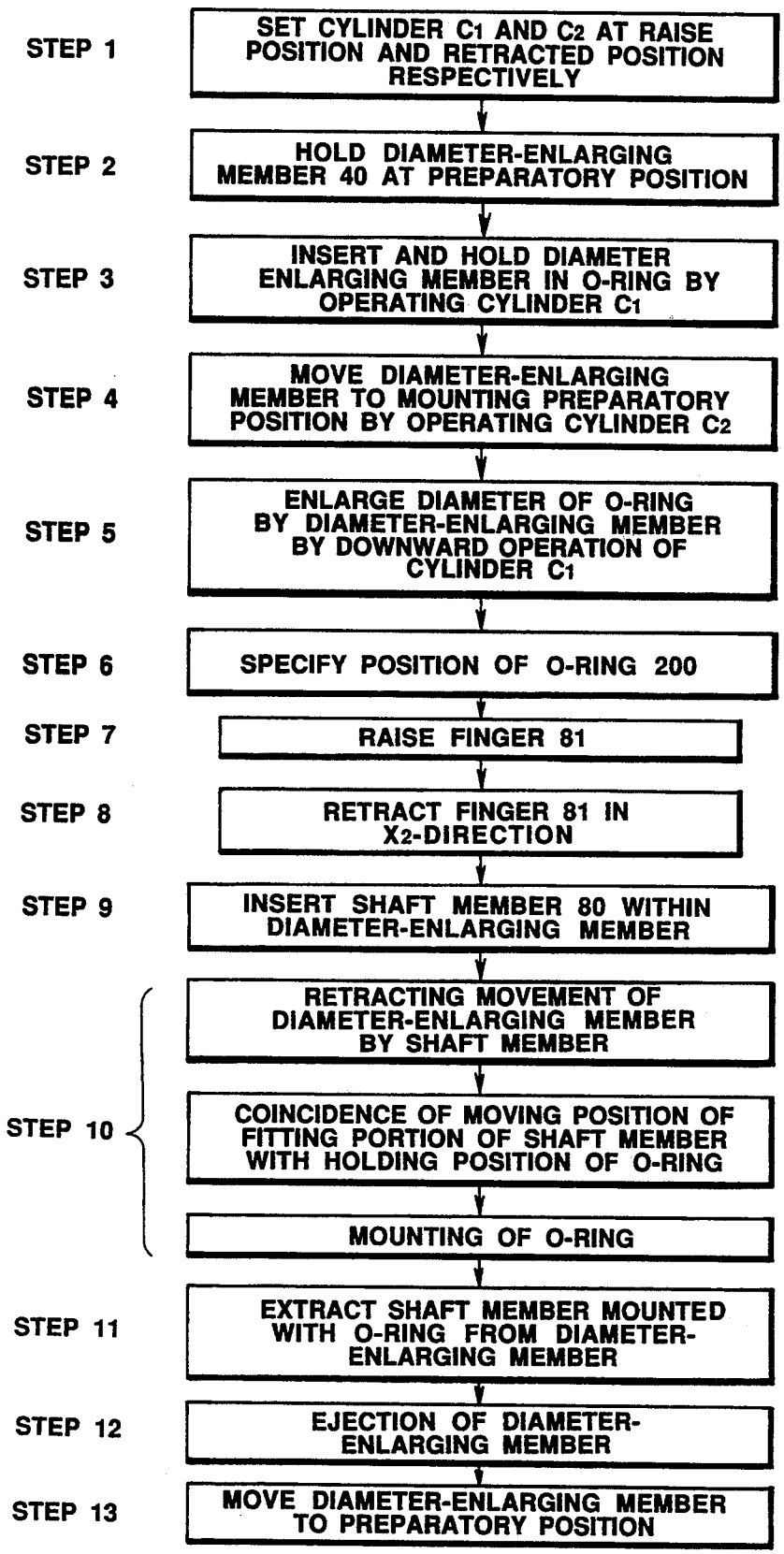
FIG. 15 is a flowchart of the operation of the apparatus according to the embodiment.

Drawing:

SHEET 14:

FIG. 15, In "STEP 1", "RAISE" should read --RAISED--.

COLUMN 4:

Line 35, "portion 40b." should read --portion 40b.--.

COLUMN 6:

Line 43, "(step 8," should read --step 6,--.

Signed and Sealed this

First Day of August, 1995

*Attest:*

BRUCE LEHMAN

*Attesting Officer*     *Commissioner of Patents and Trademarks*